June 20, 1950  H. H. GOLDSTAUB  2,512,424
TUBE RETAINER AND METHOD OF MAKING SAME
Filed April 16, 1946  2 Sheets-Sheet 1
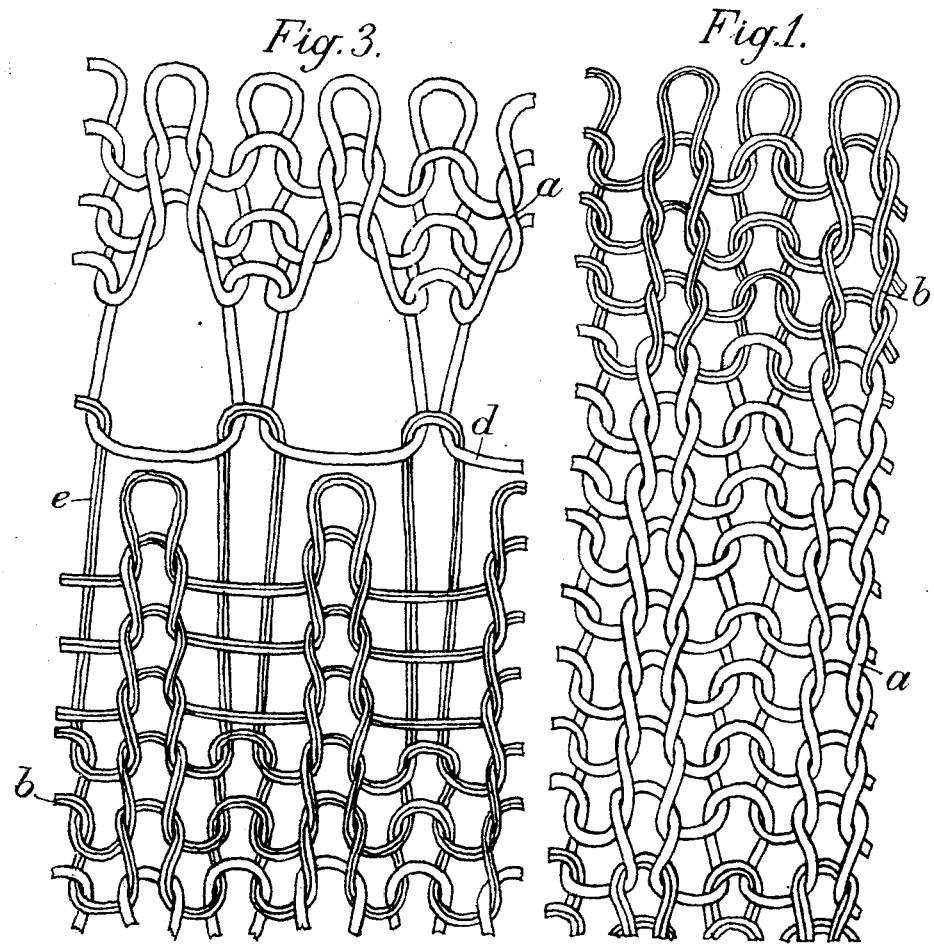
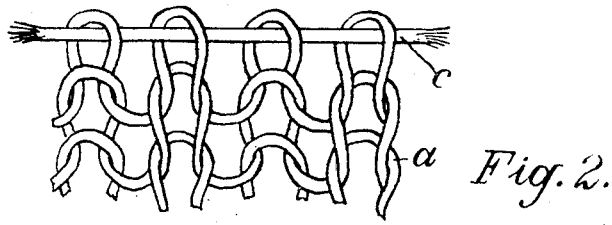
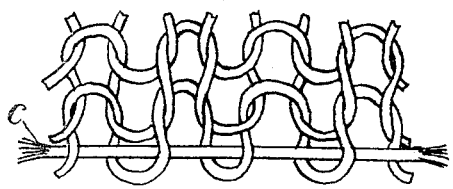
Inventor
H. H. Goldstaub June 20, 1950　　　H. H. GOLDSTAUB　　　2,512,424
TUBE RETAINER AND METHOD OF MAKING SAME
Filed April 16, 1946　　　　　　　　　　　　2 Sheets-Sheet 2
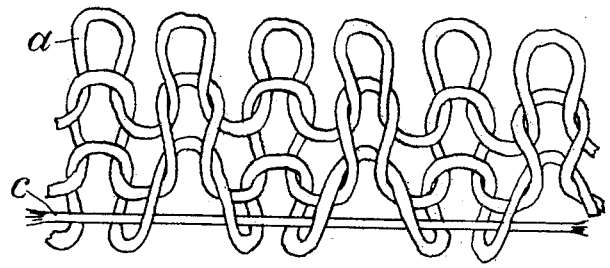
Fig. 5.
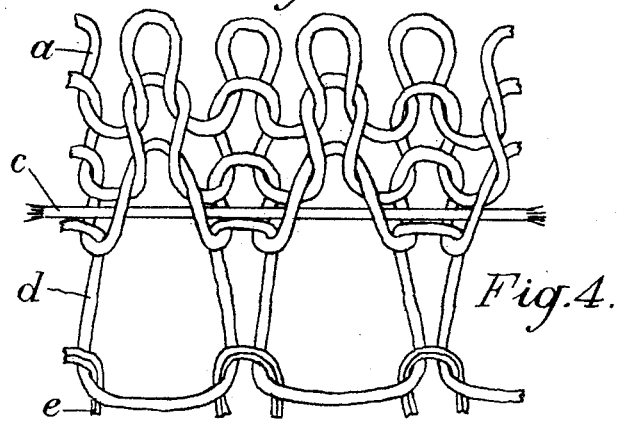
Fig. 4.
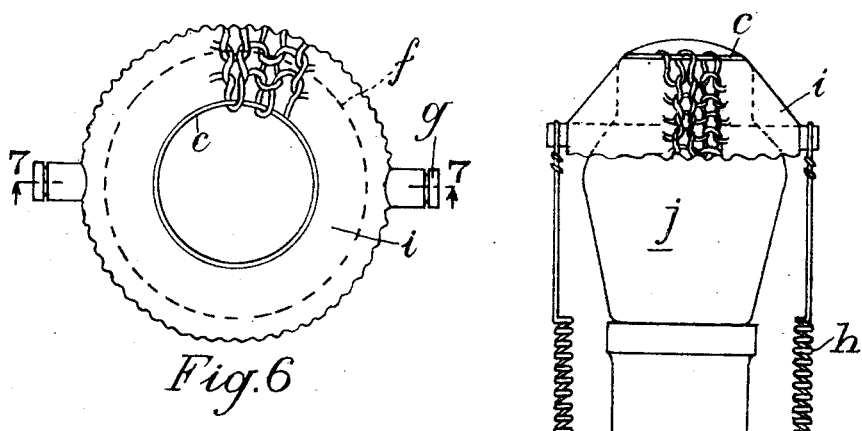
Fig. 6
Fig. 8.
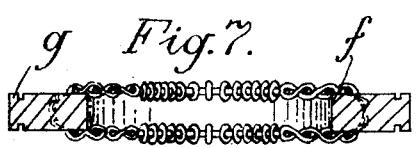
Fig. 7.
Inventor
H. H. Goldstaub Patented June 20, 1950

2,512,424

UNITED STATES PATENT OFFICE 2,512,424

TUBE RETAINER AND METHOD OF MAKING SAME

Heinz Herbert Goldstaub, Snaresbrook, England

Application April 16, 1946, Serial No. 662,528
In Great Britain April 23, 1945

8 Claims. (Cl. 248—361)

This invention relates to methods for retaining electronic valves, or tubes, herein referred to as valves, in position against vibration or shocks such as may be encountered by the use of valves on shipboard, aircraft, road or rail vehicles, though the invention is applicable to the retention of electronic valves in position generally.

One of the known methods of retaining such valves in position comprises the provision of a strip or loop fitting over the valve and held down by means of springs. Such a method is only applicable to those valves which have shoulders or some equivalent, so that it is by no means universally useful; a large number of sizes are required, because valves vary in size considerably; and further, the shape of valve envelopes is not guaranteed even within fairly large tolerances.

The object of the present invention is to provide a type of retention device particularly from the aspect of dealing with a large range of size and patterns of electronic valve with a small number of retainer sizes.

The invention consists in a method for retaining electronic valves in position against vibration or shocks comprising the provision of a valve net suitable for placing over the upper surface of a valve envelope made of glass in fibre or filament form knitted into an appropriate shape and reinforced by a circular or other ring or rim of plastic, impregnated paper, wood, metal or other material, sufficiently unaffected by heat and mechanically strong enough to take directly or through projections or the like thereon stresses due to holding down springs or like devices made of metal, rubber or the like.

The invention also consists in a method in accordance with the preceding paragraph in which the aforesaid knitting is effected on a flat knitting machine.

The invention also consists in a method according to either of the preceding paragraphs in which the knitting is effected by way of a web of alternate bands of glass in fibre or filament form and cotton, wool or other less slippery or comparatively rough surfaced yarn, the former bands being of length commensurate with the holding down of an electronic valve, and the latter forming a severance region between adjacent glass fibre portions and at the same time constituting a means of preventing laddering of the glass fibres from portion to portion.

The invention also consists in a method in accordance with any of the preceding three paragraphs in which the knitted glass fibre net is varnished, preferably with a varnish having a base of good dielectric strength, for protection against hygroscopic and mechanical effects and in which excess varnish is preferably removed by centrifugal means.

The invention also consists in an electronic valve or tube retainer suitable for placing over the upper surface of a valve envelope made of glass in fibre or filament form knitted into an appropriate shape and reinforced by a circular or other ring or rim of plastic, impregnated paper, wood, metal or other material, sufficiently unaffected by heat and mechanically strong enough to take directly or through projections or the like thereon stresses due to the holding down springs or like devices made of metal, rubber or the like.

The invention also consists in improved methods for retaining electronic valves in position against vibration or shocks substantially as herein described.

The invention also consists in improved electronic valve or tube retainers substantially as herein described.

Referring to the accompanying drawings, which are not necessarily all to the same scale—

Figure 1 shows part of a knitted web comprising alternate sections of glass fibre and cotton;

Figure 2 shows a severed and reinforced glass fibre part of Figure 1, the severance having been effected by cutting, reinforcing thread having also been inserted to prevent laddering and for strengthening purposes;

Figure 3 shows part of a knitted web comprising alternate sections of glass fibre and cotton held together by draw threads;

Figure 4 corresponds to part of Figure 3 with a reinforcing thread inserted;

Figure 5 shows the glass thread section of Figure 4 separated from the cotton section by removal of the draw thread;

Figure 6 shows the glass fibre section of Figure 2 formed into a kind of circular disc with an inserted reinforcing ring;

Figure 7 is a section on the line 7—7 of Figure 3 looking in the direction of the arrows;

Figure 8 is an assembly view of a valve held in position by a retaining device made in accordance with the present invention.

In carrying the invention into effect in the form shown by way of example, and referring first to Figure 1, on a flat knitting machine a web is knitted of suitable width in alternate sections of suitable length consisting respectively of glass $a$ in fibre, thread or filament form, and cotton $b$. Reinforcing glass threads $c$ are threaded through the end of the glass section as shown in Figure 2, after which the cotton section is severed from the glass section by cutting through the cotton portions or in any other suitable way. The glass sections are held largely in position by the introduction of the glass threads c. Figure 3 shows an alternative way of obtaining the glass section, namely by knitting into the web of cotton and glass fibres, a glass draw thread d and a co-operating cotton draw thread e. A retaining glass thread c is inserted as in Figure 2 when the arrangement becomes in conformity with Figure 4. By drawing a draw thread, preferably the cotton draw thread e the glass section is severed after which in that case the glass draw thread is withdrawn and disposed of and the result is that illustrated in Figure 5. By means of the glass thread c, sections according either to Figure 2 or to Figure 5 are then drawn to size, after which the corresponding ends of the glass threads are knotted.

Each section is then somewhat in the nature of a flat sheath form with a central aperture. A reinforcing ring f or any suitable material with or without projections g is then slipped into this sheath construction. The loose ends are then seamed up. The retainer then takes approximately the form shown in Figures 6 and 7. After this it is desirable to varnish the glass net device thus formed as a protection against moisture and against mechanical abrasion, which can be done with any convenient type of varnish. The excess varnish should be removed; this can best be done by centrifugal devices, for instance by rapidly rotating the valve retainer round its centre. On the product being dried it may be attached to springs h as indicated in Figure 8, such as are frequently employed in connection with valve retention devices, or springs for that purpose may be fitted. Figure 8 also shows how the comparatively flat retainer of Figure 4 is drawn into a somewhat conical form, as indicated by the reference letter i over the top of a valve j.

The invention is not limited to the example.

I claim:

1. In a retainer for an electronic tube, the combination of a collar for engagement about the top of the tube, said collar comprising a deformable sheath of knitted filaments; an annular rigid member within said sheath; and resilient engaging means mounted on said member for attachment to the base of the tube.

2. In a retainer for an electronic tube, the combination of a tubular knitted net composed of flexible filaments; an inflexible annular member disposed within said tubular net intermediate its ends, concentric therewith and cooperable with said net thereby deforming said net and producing a duplex collar for engagement about the top of the tube; and resilient engaging means mounted on said member for attachment to the base of the tube.

3. A method of producing a retainer for an electronic tube removably mounted in a base, which comprises knitting a web of the proper width and length composed of flexible filaments, connecting the ends of the web to form a tubular sheath, disposing an inflexible annulus in the sheath intermediate its ends, disposing drawstrings in said ends of the sheath, drawing said ends to reduced identical diameters by said drawstrings disposed concentric with said annulus, thereby deforming said sheath to produce a duplex collar for engagement about the top of the tube, and attaching to said annulus resilient engaging means adapted for attachment to the base for the tube.

4. A method of producing retainers for electronic tubes removably mounted in bases which comprises knitting a web composed of alternate sections of glass filaments and cotton filaments, respectively, inserting a retaining glass filament in the edge on each side of each section composed of glass filaments, separating the respective filaments, connecting the ends of each glass filament section to form a tubular sheath having the retaining filaments at the ends of the sheath, respectively, disposing an inflexible annulus in each sheath intermediate its ends, drawing said ends of each sheath to reduced identical diameters by said retaining filaments disposed concentric with said annulus thereby deforming each sheath to produce a duplex collar for engagement about the top of a tube, and attaching to each of said annuli resilient engaging means adapted for attachment to a base of a tube.

5. A method as defined in and by claim 3 wherein said knitting step comprises flat knitting, varnishing said sheath with a varnish having a base of good dielectric strength for protection against hygroscopic and mechanical effects and removing excess varnish prior to the attachment of the resilient engaging means.

6. A retainer for an electronic tube comprising a tubular fabric sheath of glass filaments, an annular rigid member within said sheath, means retaining said sheath about said member and providing a duplex collar having a central opening and a diameter greater than an electronic tube, and resilient engaging means mounted on said member for attachment to the base on which the tube is mounted.

7. A retainer as defined in and by claim 6 and projections extending from said member exteriorally thereof through said fabric, and said engaging means being mounted on said projections.

8. A retainer for an electronic tube comprising an annular rigid member, a knitted fabric collar secured to said member, both said collar and member having a diameter greater than an electronic tube, and resilient engaging means mounted on said member for attachment to the base on which the tube is mounted.

HEINZ HERBERT GOLDSTAUB.

REFERENCES CITED

The following references are of record in the file of this patent:

UNITED STATES PATENTS

| Number | Name | Date |
|---|---|---|
| 579,295 | Delzell | Mar. 23, 1897 |
| 1,191,762 | Conant | July 18, 1916 |
| 2,072,939 | Betts | Mar. 9, 1937 |
| 2,313,344 | Jacob | Mar. 9, 1943 |
| 2,382,428 | Leuvelink | Aug. 14, 1945 |

FOREIGN PATENTS

| Number | Country | Date |
|---|---|---|
| 691,085 | France | July 1, 1930 |